US011473776B2

(12) United States Patent
Yamamoto et al.

(10) Patent No.: US 11,473,776 B2
(45) Date of Patent: Oct. 18, 2022

(54) BURNER, METHOD FOR OPERATING BURNER, AND METHOD FOR MELTING AND REFINING COLD IRON SOURCE

(71) Applicant: TAIYO NIPPON SANSO CORPORATION, Tokyo (JP)

(72) Inventors: Yasuyuki Yamamoto, Kofu (JP); Yoshiyuki Hagihara, Kofu (JP); Naoki Seino, Kai (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 604 days.

(21) Appl. No.: 16/491,320

(22) PCT Filed: Nov. 30, 2017

(86) PCT No.: PCT/JP2017/043130
§ 371 (c)(1),
(2) Date: Sep. 5, 2019

(87) PCT Pub. No.: WO2018/179588
PCT Pub. Date: Oct. 4, 2018

(65) Prior Publication Data
US 2020/0011526 A1 Jan. 9, 2020

(30) Foreign Application Priority Data

Mar. 31, 2017 (JP) .............................. JP2017-071389

(51) Int. Cl.
*F23D 14/22* (2006.01)
*C21B 13/00* (2006.01)
(Continued)

(52) U.S. Cl.
CPC .......... *F23D 14/22* (2013.01); *C21B 13/0006* (2013.01); *F23D 11/38* (2013.01); *F23D 14/48* (2013.01); *F23D 14/76* (2013.01)

(58) Field of Classification Search
CPC ....... C21C 5/4606; F23D 11/38; F23D 14/22; F23D 14/48; F23D 14/76; C21B 13/0003
(Continued)

(56) References Cited

U.S. PATENT DOCUMENTS 5,714,113 A * 2/1998 Gitman ............... F27D 99/0033
432/13
5,858,302 A 1/1999 Gitman et al.
(Continued)

FOREIGN PATENT DOCUMENTS

CN 2573872 9/2003
CN 1615372 5/2005
(Continued)

OTHER PUBLICATIONS

International Search Report for PCT/JP2017/043130, dated Jan. 23, 2018, 4 pages.
(Continued)

*Primary Examiner* — Vivek K Shirsat
(74) *Attorney, Agent, or Firm* — Nixon & Vanderhye P.C.

(57) ABSTRACT

One object of the present invention is to provide a burner which makes it possible to prevent blockage and damage of the nozzle by the molten metal and the slag, and the present invention provides a burner including a combustion supporting gas supply passage which is configured to supply a combustion supporting gas toward a combustion supporting gas outlet provided at the center of the tip end side; a fuel supply passage which is configured to supply a fuel toward a fuel ejection outlet provided around the combustion supporting gas outlet; and a protective nozzle provided from a position surrounding a periphery of the fuel ejection outlet so as to project forward beyond the tip end surface at which the combustion supporting gas ejection outlet and the fuel ejection outlet are provided; wherein the combustion sup- (Continued)

porting gas supply passage includes a Laval nozzle, and a diameter-enlarged nozzle of which a diameter gradually increases from the tip end of the Laval nozzle toward the combustion supporting gas ejection outlet, and the protective nozzle has a shape which is gradually reduced in diameter forward from the tip end surface.

12 Claims, 4 Drawing Sheets

(51) Int. Cl.
 *F23D 11/38* (2006.01)
 *F23D 14/48* (2006.01)
 *F23D 14/76* (2006.01)
(58) Field of Classification Search
 USPC .......................................................... 431/9
 See application file for complete search history.

(56) References Cited

U.S. PATENT DOCUMENTS

| | | | |
|---|---|---|---|
| 6,432,165 | B1 | 8/2002 | Dittrich et al. |
| 2002/0035892 | A1 | 3/2002 | Allemand et al. |
| 2002/0096809 | A1 | 7/2002 | Shver et al. |
| 2017/0218470 | A1 | 8/2017 | Abel et al. |

FOREIGN PATENT DOCUMENTS

| | | |
|---|---|---|
| CN | 101487073 | 7/2009 |
| DE | 10 2014 215794 | 2/2016 |
| EP | 0 777 751 | 6/1997 |
| EP | 0 866 140 | 9/1998 |
| EP | 2 333 120 | 6/2011 |
| JP | 62-116816 | 5/1987 |
| JP | 63-025410 | 2/1988 |
| JP | 06-074425 | 3/1994 |
| JP | 06-257724 | 9/1994 |
| JP | 10-267220 | 10/1998 |
| JP | 2001-526320 | 12/2001 |
| JP | 2002-105528 | 4/2002 |
| JP | 2003-194307 | 7/2003 |
| JP | 2004-093110 | 3/2004 |
| WO | 96/06954 | 3/1996 |
| WO | 00/28097 | 5/2000 |
| WO | WO 2010/076214 | 7/2010 |

OTHER PUBLICATIONS

Search Report issued in corresponding EP App. No. 17902638.0 (dated Nov. 23, 2020), 22 pages.
Office Action issued in corresponding TW App. No. 106141870 (dated Dec. 10, 2020) w/ partial translation, 10 pages.
Office Action issued in CN Appln. No. 201780088699.3 dated Aug. 5, 2020 (w/ partial translation).

* cited by examiner

BURNER, METHOD FOR OPERATING BURNER, AND METHOD FOR MELTING AND REFINING COLD IRON SOURCE

This application is the U.S. national phase of International Application No. PCT/JP2017/043130 filed 30 Nov. 2017, which designated the U.S. and claims priority to JP Patent Application No. 2017-071389 filed 31 Mar. 2017, the entire contents of each of which are hereby incorporated by reference.

FIELD OF THE INVENTION

The present invention relates to a burner, a method for operating a burner, and a method for melting and refining a cold iron source.

DESCRIPTION OF RELATED ART

A burner, which ejects fuel and a combustion supporting gas containing oxygen from a nozzle, combusts them to form a flame, and heats an object to be heated by the flame, has been used in a furnace for melting and refining a cold iron source. For example, in an arc furnace steelmaking process, when a raw material such as iron scraps are heated and molten in an electric furnace, a low temperature region called a cold spot is generated in the raw material, and the raw material at the low temperature region may be difficult to melt. For this reason, the raw material at the low temperature region is heated by a burner to promote the melting.

The use of such a burner can increase the heating efficiency of the raw material, reduce the power consumption necessary for melting the raw material, and reduce the melting cost. In addition, it is known that oxidizing and melting a part of the raw material using a combustion supporting gas accelerates cutting and enhances the heating efficiency of the raw material.

In the burner, the cutting speed of the object to be heated can be increased, and the heating efficiency can be increased by increasing the flow rate of the combustion supporting gas. Therefore, there is a demand for speeding up of the combustion supporting gas. However, when the flow rate of the combustion supporting gas is accelerated, the flame moves away from the nozzle and the combustion becomes unstable.

Further, in the arc furnace, scattering of molten metal or slag due to boiling caused by CO gas generation from the molten steel and the slag, splashing of the molten metal or the slag due to collision of a high-speed flame with the raw material, and the like are generated.

In the burner, the nozzle may be blocked or eroded due to the molten metal or the slag. For this reason, it is necessary to maintain the burner frequently. In particular, since the ejection rate of the fuel cannot be as high as the ejection rate of the combustion supporting gas, the nozzle for the fuel tends to be blocked. In order to suppress such blockage of the fuel nozzle, a method such as increasing the fuel ejection rate as fast as possible has been used.

For example, in the burner described in Patent Document 1 below, a stable high-speed flame is formed by providing an ejection passage of the combustion supporting gas at the center, a groove for holding the flame at an outlet of the ejection passage, and an ejection passage for the fuel between the ejection passage of the combustion supporting gas and the groove.

On the other hand, in the burner described in Patent Document 2 below, a stable high-speed flame is formed by providing an ejection passage of the combustion supporting gas at the center, a groove for holding the flame at an outlet of the ejection passage for the combustion supporting gas, a first ejection passage of the fuel between the ejection passage of the combustion supporting gas and the groove, and a second ejection passage for the fuel around the outlet of the combustion supporting gas.

On the other hand, in the burner described in Patent Document 3 below, a high-speed flame is formed by providing an ejection passage of a main combustion supporting gas at the center, an ejection outlet of the fuel around the ejection passage, and an ejection passage of an auxiliary combustion supporting gas on the outer side of the ejection outlet of the fuel, forming a flame envelope around a jet flow of the main combustion supporting gas, and obtaining a coherent jet flow of the main gas. In addition, a baffle plate is provided on the front of the nozzle to turn inward and direct the flame to the jet flow of the combustion supporting gas in order to suppress the damping of the flow rate of the main combustion supporting gas.

In addition, Patent Document 3 discloses that when assuming combustion heat of the fuel gas is Q [MMBtu/h], and a diameter of a hole provided in the baffle plate is D [inch], it is important that $Q/D \geq 0.6$, and that when assuming a flow rate of the combustion supporting gas is V [thousand cubic feet/h], an oxygen concentration in the combustion supporting gas is P [% by volume], and the diameter of the hole provided in the baffle plate is D [inch], it is important that $VP/D \geq 70$.

When a burner, in which a flow rate of liquefied natural gas (LNG) is 435 $Nm^3/h$ and a flow rate of oxygen is 1000 $Nm^3/h$, is applied to this condition, for example, the diameter D of the hole provided in the baffle plate is 709 mm (27.9 inches). Further, from the relationship of $VP/D \geq 70$, the diameter D of the hole provided in the baffle plate is 1361 mm (53.6 inches).

PRIOR ART DOCUMENTS

Patent Literature

Patent Document 1: Japanese Unexamined Patent Application, First Publication No. 2003-194307
Patent Document 1: Japanese Unexamined Patent Application, First Publication No. 2004-93110
Patent Document 1: Japanese Unexamined Patent Application, First Publication No. H10-267220

DISCLOSURE OF THE INVENTION

Problem to be Solved by the Invention

In the arc furnace, in order to prevent the blockage of the nozzle due to the scattered molten metal and slag mentioned above, when using a fuel having a low supply pressure or a fuel having poor combustibility, it is necessary to slow the ejection rate of the fuel from a nozzle. However, in this case, splashing tends to block the nozzle holes, resulting in damage to the nozzles and frequent maintenance.

In addition, when the ejection rate of the fuel is low, it is easily affected by disturbance due to the flow of the combustion supporting gas in the furnace, and the like, and a good flame cannot be formed around the central jet flow. In this case, the damping of oxygen at the center is faster, and the heating performance and cutting performance decrease.

Moreover, when using a fuel having a low calorific value, the volume per unit volume increases, so the diameter of the hole of the fuel nozzle must be increased, and the nozzle hole tends to be blocked. Furthermore, when using a fuel having poor flammability, the flame can easily blow off, so the fuel cannot be ejected at high speed.

Furthermore, in the burner described in Patent Document 1, since the fuel ejection passage is disposed in the combustion supporting gas ejection passage, the cross-sectional area of the fuel ejection passage cannot be increased, and the ejection rate of the fuel cannot be reduced. Therefore, it is difficult to apply the burner to a fuel having a low supply pressure or poor combustibility.

On the other hand, in the burner described in Patent Document 2, although the cross-sectional area of the fuel ejection passage can be increased, since the fuel ejection passage is disposed on the front surface of the burner, the fuel ejection passage is easily blocked by the scattered molten metal and slag. Furthermore, in the case of using a fuel having a low calorific value, since the volume per calorific value is large, the cross-sectional area of the fuel ejection passage is large, and the fuel ejection passage is more easily blocked.

On the other hand, in the burner described in Patent Document 3, the diameter of the hole provided in the baffle plate is 709 mm or 1361 mm as described above, and the blockage of the nozzle due to the scattered molten metal or the slag cannot be prevented. Further, in the burner described in Patent Document 3, when the diameter of the hole provided in the baffle plate is out of the range above, since the jet flow of the combustion supporting gas at the center cannot be surrounded by the flame, the damping of the combustion supporting gas becomes faster, and a flame with high speed cannot be obtained.

The present invention has been proposed in view of such conventional circumstances, and the object of the present invention is to provide a burner, a method for operating a burner, and a method for melting and refining a cold iron source which makes it possible to prevent blockage and damage of the nozzle by the molten metal and the slag.

Means to Solve the Problem

In order to achieve the above object, the present invention provides the following means.

[1] A burner, including a combustion supporting gas supply passage which is configured to supply a combustion supporting gas toward a combustion supporting gas outlet provided at the center of the tip end side;

a fuel supply passage which is configured to supply a fuel toward a fuel ejection outlet provided around the combustion supporting gas outlet; and a protective nozzle provided from a position surrounding a periphery of the fuel ejection outlet so as to project forward beyond the tip end surface at which the combustion supporting gas ejection outlet and the fuel ejection outlet are provided;

wherein the combustion supporting gas supply passage includes a Laval nozzle, and a diameter-enlarged nozzle of which a diameter gradually increases from the tip end of the Laval nozzle toward the combustion supporting gas ejection outlet, and the protective nozzle has a shape which is gradually reduced in diameter forward from the tip end surface.

[2] The burner according to [1], wherein the combustion supporting gas supply passage includes a diameter-equal nozzle of which a diameter from the tip end of the diameter-enlarged nozzle to the combustion supporting gas ejection outlet is the same.

[3] The burner according to [2], wherein a groove is provided on the entire inner circumferential surface of the diameter-equal nozzle.

[4] The burner according to any one of [1] to [3], wherein assuming that the cross-sectional area having the largest diameter at the tip end side in the diameter-enlarged nozzles is $A_1$, and the cross-sectional area having the smallest diameter at the proximal end side is $A_2$, $A_1$ and $A_2$ satisfy $1.5 \leq A_1/A_2 \leq 3.0$.

[5] The burner according to any one of [1] to [4], wherein an opening angle of the diameter-enlarged nozzle is equal to or larger than an opening angle of the Laval nozzle, and a half apex angle of the diameter-enlarged nozzle is 30° or less.

[6] The burner according to any one of [1] to [5], wherein the fuel ejection outlet includes a plurality of holes arranged concentrically with the combustion supporting gas ejection outlet

[7] The burner according to any one of [1] to [5], wherein the fuel ejection outlet includes a hole concentrically formed with the combustion supporting gas ejection outlet.

[8] The burner according to any one of [1] to [7], wherein the half apex angle of the protective nozzle is in a range of 5° to 45°.

[9] The burner according to any one of [1] to [8], wherein when assuming a maximum diameter of the diameter-enlarged nozzle is $d_3$[m], a diameter at the tip end of the protective nozzle is $d_4$[m], and a flow rate of the fuel required to combust at a stoichiometric ratio (oxygen ratio=1) with respect to a flow rate of the combustion supporting gas supplied is $Q_f$[Nm$_3$/h], the $d_3$ and $d_4$ are set such that a flow rate V [Nm/s] of the fuel obtained by dividing $Q_f$ by an area A, which is obtained by subtracting an area of the outlet of the diameter-enlarged nozzle from an area of the outlet of the protective nozzle obtained by the following formula (1), satisfy $50 \leq V \leq 200$ $$V=(Q_f/3600)/A \quad (1)$$

$$A=\pi/4 \times (d_4^2 - d_3^2).$$

[10] A method for operating a burner according to any one of [1] to [9], wherein oxygen having a concentration of 20.95% to 100% is used as the combustion supporting gas.

[11] The method for operating a burner according to [10], wherein a flow rate of the fuel ejected from the fuel ejection outlet is 10 m/s or more.

[12] The method for operating a burner according to [10] or [11], wherein an oxygen ratio is in a range of 1 to 10.

[13] A method for melting and refining a cold iron source using a burner according to any one of [1] to [9], wherein the method includes a melting step in which the cold iron source is molten, and a refining step in which the cold iron source is refined after the melting step, wherein an oxygen ratio is adjusted in a range of 1 to 5 in the melting step, the oxygen ratio is adjusted in a range of 3 to 10 in the refining step, and a flow rate of the fuel is adjusted independently in the melting step and the refining step.

Effects of the Invention

As described above, according to the present invention, it is possible to provide a burner, a method for operating the burner, and a method for melting and refining a cold iron source which can prevent the blockage and the damage of the nozzle due to the molten metal and the slag.

DETAILED DESCRIPTION OF THE INVENTION

Figure 1:
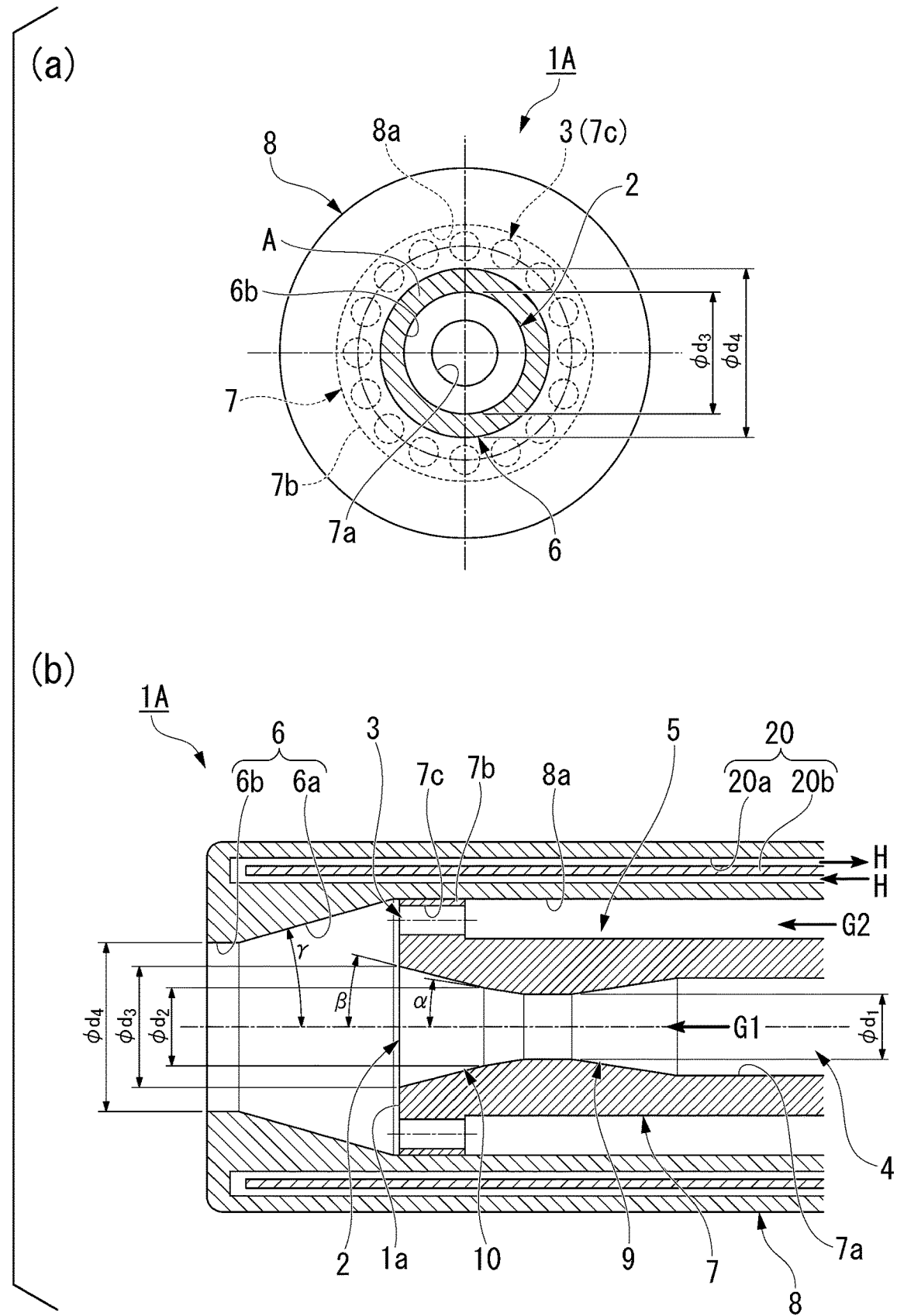
FIG. 1 shows the configuration of a burner according to the first embodiment of the present invention, wherein (a) is a front view as viewed from the tip end side, and (b) is a cross-sectional view along the axial direction.

Hereinafter, embodiments of the present invention will be described in detail with reference to the drawings. In the drawings used in the following description, in order to make the features easy to understand, the features may be enlarged for the sake of convenience, and the dimensional ratio of each component may be limited to the same as the actual one. In addition, the materials and the like exemplified in the following description are merely examples, and the present invention is not necessarily limited to them, and can be appropriately changed and implemented without changing the gist of the invention.

(Burner)

First Embodiment

First, as a first embodiment of the present invention, for example, a burner 1A shown in FIG. 1 (a) and FIG. 1 (b) will be described. FIG. 1 shows the configuration of the burner 1A, wherein (a) is a front view as viewed from the tip end side, and (b) is a cross-sectional view along the axial direction.

As shown in FIGS. 1(a) and 1(b), the burner 1A of this embodiment includes a combustion supporting gas ejection outlet 2 provided in the center of the tip end side, a fuel ejection outlet 3 which is provided around the combustion supporting gas ejection outlet 2, a combustion supporting gas supply passage 4 for supplying a combustion supporting gas G1 towards the combustion supporting gas ejection outlet 2, fuel supply passages 5 for supplying a fuel G2 toward the fuel ejection outlet 3, and a protective nozzle 6 provided from a position surrounding the periphery of the fuel ejection outlet 3 so as to project forward beyond the tip end surface 1a at which the combustion supporting gas ejection outlet 2 and the fuel ejection outlet 3 are provided.

The burner 1A is formed by a first nozzle member 7 disposed at the center of the burner 1A and a second nozzle member 8 disposed concentrically outside the first nozzle member. The first and second nozzle members 7 and 8 constituting the burner 1A are formed using, for example, a metal material excellent in thermal conductivity such as copper or a copper alloy (brass). However, the material for the first and second nozzle members 7 and 8 is not necessarily limited to these metal materials.

The first nozzle member 7 has a hole 7a having a circular cross section the center of which penetrates in the axial direction, and is formed in a substantially cylindrical shape as a whole. The combustion supporting gas supply passage 4 is constituted by the hole 7a. The combustion supporting gas ejection outlet 3 is located at the tip end of the first nozzle member 7. That is, the combustion supporting gas ejection outlet 3 and the tip end of the hole 7a are on the same plane. Further, a flange portion 7b is provided on the tip end side of the first nozzle member 7 so as to protrude in the diameter expansion direction.

The second nozzle member 8 has a hole 8a having a circular cross section the center of which penetrates in the axial direction, and is formed in a substantially cylindrical shape as a whole. The first nozzle member 7 is disposed inside the hole 8a so that the flange 7b is in contact with the hole 8a over the entire circumference. Further, the tip end surface 1a is formed at the tip end of the first nozzle member 7 including the flange portion 7b.

The fuel supply passage 5 is a flow passage having an annular cross section formed between the first nozzle member 7 and the hole 8a (the second nozzle member 8). The fuel ejection outlet 3 is configured by arranging a plurality of holes 7c which axially penetrate the flange 7b, concentrically with the combustion supporting gas ejection outlet 2. The plurality of holes 7c have the same diameter and are formed in a circular shape in cross section.

The fuel ejection outlet 3 is not limited to the case in which the plurality of holes 7c form the fuel ejection outlet 3 described above. It is also possible to omit the flange 7b described above, and the fuel ejection outlet 3 may be a hole which is formed at the tip end of a flow passage formed between the first nozzle member 7 and the hole 8a (second nozzle member 8), and has an annular cross section formed concentrically with the combustion supporting gas ejection outlet 2.

The combustion supporting gas supply passage 4 (the hole 7a) is configured to include a Laval nozzle 9 and a diameter-enlarged nozzle 10 from the upstream (proximal) side toward the downstream (tip) side. The Laval nozzle 9 is for making the combustion supporting gas G1 supersonic, and has a shape in which the diameter becomes smaller in the middle of the hole 7a. On the other hand, the diameter-enlarged nozzle 10 is for forming a stable flame, and has a shape in which the diameter gradually increases from the tip end of the Laval nozzle 9 toward the combustion supporting gas ejection outlet 2.

The throat diameter d1 and the outlet diameter d2 which are the dimensions of the Laval nozzle 9 depend on the flow rate, the ejection speed, and the composition of the combustion supporting gas G1. When the half apex angle a of the Laval nozzle 9 and the half apex angle β of the diameter-enlarged nozzle 10 are the same, the diameter of the combustion supporting gas ejection outlet 2 is larger than the outlet diameter $d_2$ of the Laval nozzle 9.

The protective nozzle 6 is for protecting the combustion supporting gas ejection outlet 2 and the fuel ejection outlet 3 from the scattered molten metal, slag, and the like. The protective nozzle 6 is formed by the second nozzle member 8 which projects forward of the end surface 1a (the end of the first nozzle member 7). That is, the inner wall of the protective nozzle 6 corresponds to the wall forming the hole 8a which projects forward with respect to the end face 1a.

The protective nozzle 6 has a shape (this portion is referred to as a diameter-reduced portion 6a) of which the diameter is gradually reduced forward from the tip end surface 1a. The tip end (tip end surface 1a) of the first nozzle member 7 is located at the boundary between the diameter-equal portion and the diameter-reduced portion of the hole 8a. In addition, the tip end of the protective nozzle 6 has a shape (this part is referred to as the diameter-equal portion 6b) having the same diameter from the position having the smallest diameter toward the tip end.

The second nozzle member 8 is provided with a water cooling jacket 20 for cooling by circulation of the cooling water H. The water cooling jacket 20 has a structure in which a flow passage 20a which is formed inside of the second nozzle member 8 is divided by a partition wall 20b into an inner side and an outer side, and the inner side and the outer side are connected by a connection portion provided on the tip end side. The cooling water H cools the burner 1 by being circulated from the inner side to the outer side of the flow passage 20a.

In the burner 1A which has the above structures, for example, oxygen can be used as the combustion supporting gas G1, and liquefied natural gas (LNG) can be used as the fuel G2. As the fuel G2, in addition to the LNG for example, hydrocarbon gas such as city gas or liquefied propane gas (LPG), coke oven gas (COG), blast furnace gas (BFG), carbon monoxide (CO), hydrogen ($H_2$), and a mixed gas thereof can be used.

In the burner 1A, while ejecting the combustion supporting gas G1 supplied from the combustion supporting gas supply passage 4 forward from the combustion supporting gas ejection outlet 2, and the fuel $G_2$ supplied from the fuel supply passage 4 (hole 7a) forward from the fuel ejection outlet 3, the combustion supporting gas G1 and the fuel are combusted to form a flame, and an object to be heated is heated by the flame.

In the burner 1 of the present embodiment, when the diameter-enlarged nozzle 10 having the expanded diameter is provided at the tip end of the Laval nozzle 9, the outside of the jet flow of the combustion supporting gas G1 ejected from the Laval nozzle 9 becomes negative pressure, and circulating flow is formed between the jet flow and the wall surface of the diameter-enlarged nozzle 10. Furthermore, the fuel G2 is drawn into the circulating flow, and a stable flame is formed. Therefore, it is possible to suppress the damping of the combustion supporting gas G1 and form a high-speed flame further by surrounding the combustion supporting gas G1 by this flame.

Further, in the burner 1 of the present embodiment, the spread of the flame can be suppressed by providing the protective nozzle 6 having the diameter-reduced portion 6a so as to project more forward than the tip end surface 1a provided with the combustion supporting gas ejection outlet 2 and the fuel ejection outlet 3. As a result, the combustion supporting gas G1 and the fuel G2 which have high speed can be ejected from each of the ejection outlets 2 and 3.

Therefore, in the burner 1 of the present embodiment, even when the fuel G2 having a low supply pressure is used, it is possible to suppress the intrusion of the scattered molten metal, slag and the like into the respective ejection outlets 2 and 3 and it is possible to prevent blockages and damage of the nozzle.

Second Embodiment

Figure 2:
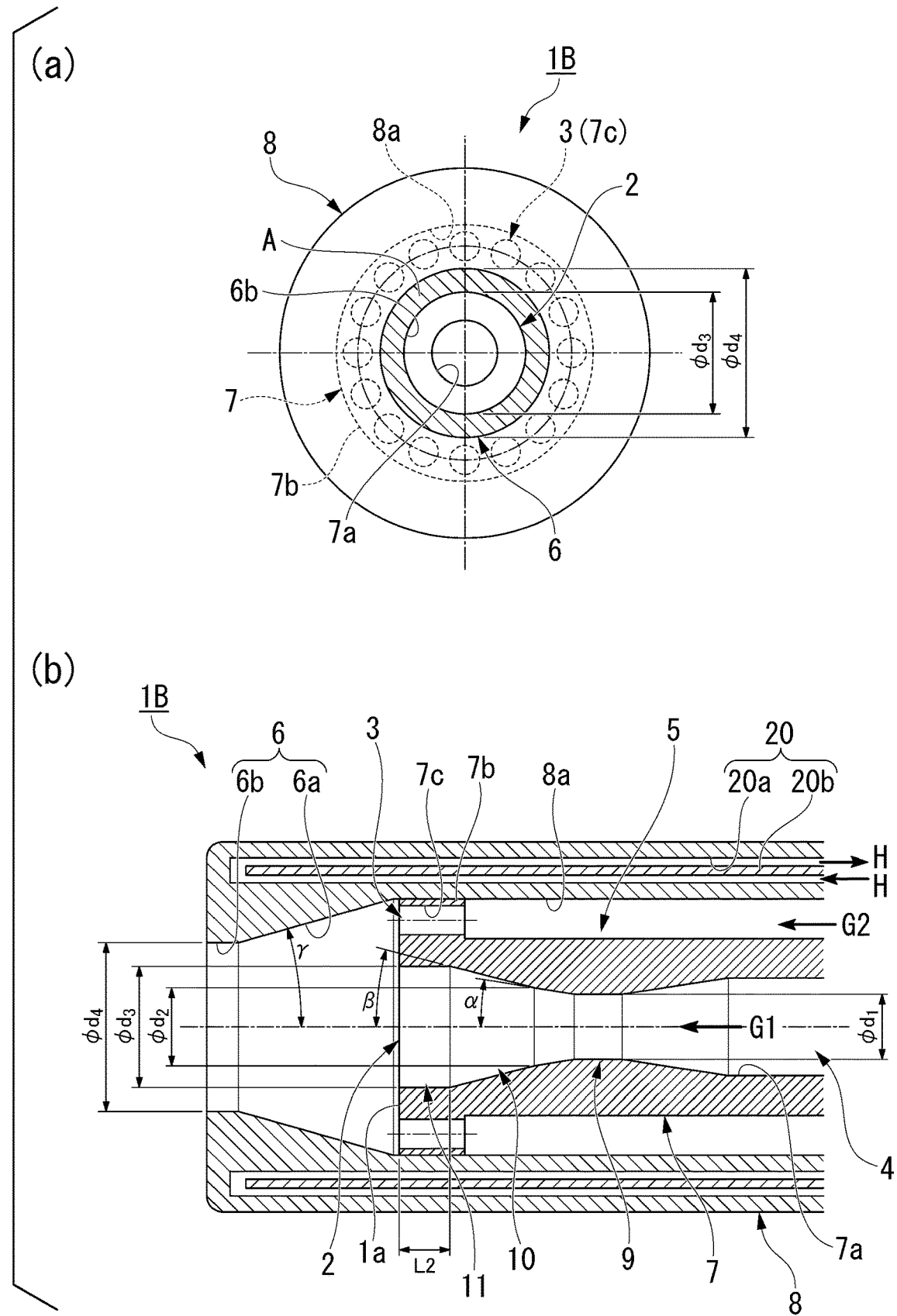
FIG. 2 shows the configuration of a burner according to a second embodiment of the present invention, wherein (a) is a front view as viewed from the tip end side, and (b) is a cross-sectional view along the axial direction.

Next, as a second embodiment of the present invention, a burner 1B shown in FIG. 2 will be described. FIG. 2 shows the configuration of the burner 1B, wherein (a) is a front view as viewed from the tip end side, and (b) is a cross-sectional view along the axial direction. Moreover, in the following description, the same portions as those in the burner 1A are indicated by the same reference numerals, and the description thereof is omitted.

In the burner 1B of this embodiment, as shown in FIG. 2, the combustion supporting gas supply passage 4 includes the Laval nozzle 9, the diameter-enlarged nozzle 10, and a diameter-equal nozzle 11 from the upstream (proximal) side to the downstream (tip) side.

The diameter-equal nozzle 11 having a length L2 in the axial direction has the same diameter from the tip end of the diameter-enlarged nozzle 10 toward the combustion supporting gas ejection outlet 2. Other than this structure, the burner 1B has fundamentally the same structure as that of the burner 1A.

In the burner 1B of the present embodiment, the flame formed by the diameter-enlarged nozzle 10 can be directed in the axial direction, and the spread of the flame can be suppressed by adding the diameter-equal nozzle 11. In addition, the flame surrounds the jet flow of the combustion supporting gas G1 flowing in the center, and the combustion supporting gas G1 flows parallel to the axial direction. As a result, the damping of the combustion supporting gas G1 is suppressed, and it becomes possible to form a high-speed flame further.

Third Embodiment

Figure 3:
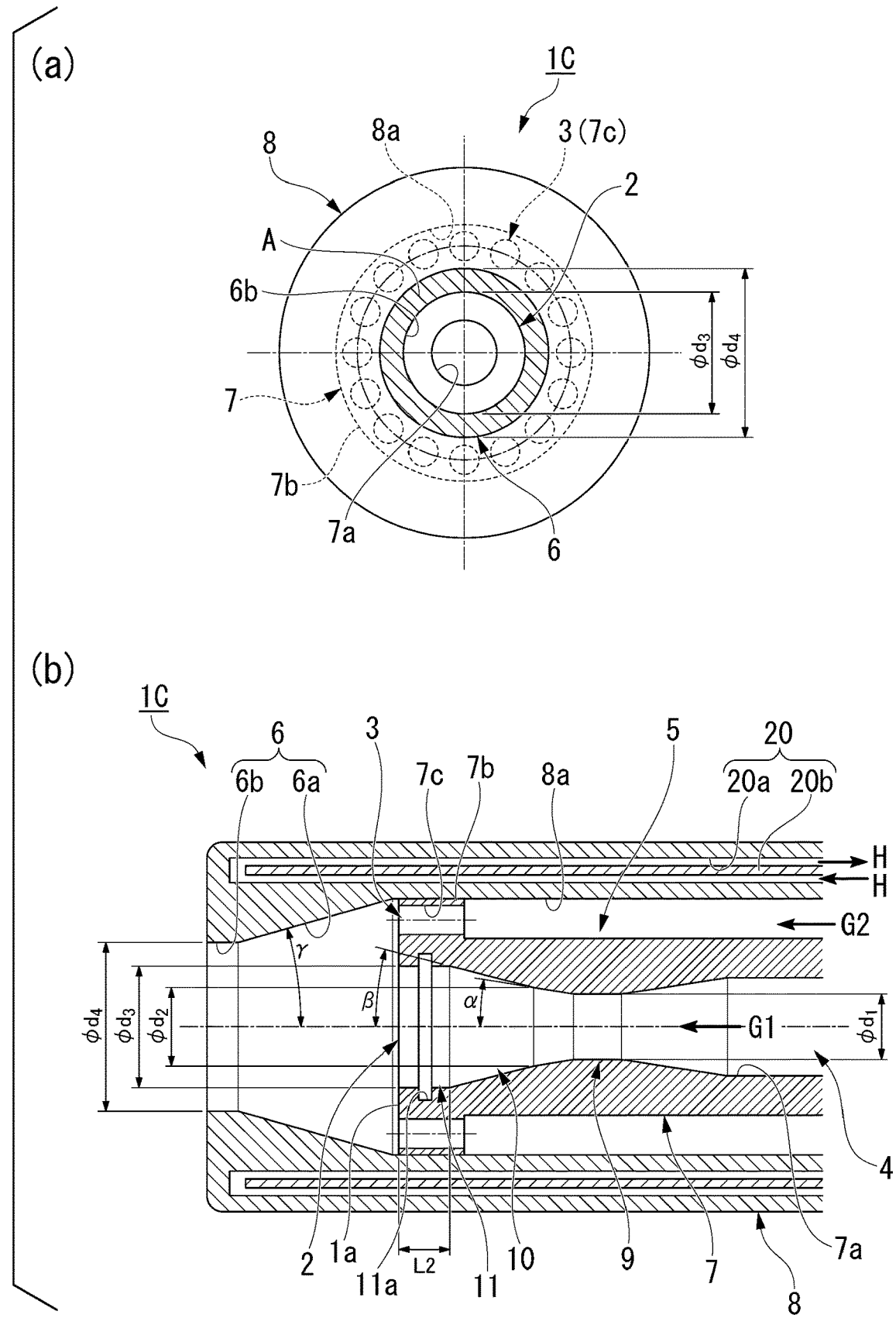
FIG. 3 shows the configuration of the burner according to a third embodiment of the present invention, wherein (a) is a front view as viewed from the tip end side, and (b) is a cross-sectional view along the axial direction.

Next, as a third embodiment of the present invention, a burner 1C shown in FIG. 3 will be described. FIG. 3 shows the configuration of the burner 1C, wherein (a) is a front view as viewed from the tip end side, and (b) is a cross-sectional view along the axial direction. Moreover, in the following description, the same portions as those in the burner 1A and 1B are indicated by the same reference numerals, and the description thereof is omitted.

In the burner 1C of the present embodiment, as shown in FIG. 3, a groove 11a is provided on the inner circumferential surface of the diameter-equal nozzle 11 over the entire circumference. Other than this structure, the burner 1C has fundamentally the same structure as those of the burner 1A and 1B.

In the burner 1C of the present embodiment, since the groove portion 11a is provided on the inner peripheral surface of the diameter-equal nozzle 11a, the flame-holding effect explained above becomes large. As a result, even when the fuel G2 has a low calorific value or poor combustibility, it is possible to form a stable ambient flame.

Fourth Embodiment

Next, as the fourth embodiment of the present invention, preferable conditions of the burners 1A, 1B and 1C will be described.

In the burners 1A, 1B, and 1C of the present embodiment, in the diameter-enlarged nozzle 10, assuming that the cross-sectional area having the largest diameter at the tip end side is A1, and the cross-sectional area having the smallest diameter at the proximal side is A2, it is preferable to satisfy the following condition.

$$1.5 \leq A_1/A_2 \leq 3.0$$

By satisfying this condition, a region of negative pressure is formed between the wall surface of the diameter-enlarged nozzle 10 and the jet flow of the combustion supporting gas G1, and it becomes possible to form a stable flame so as to surround the combustion supporting gas G1.

Further, in the burners 1A, 1B, and 1C of the present embodiment, it is preferable that the opening angle (half apex angle β) of the diameter-enlarged nozzle 10 be equal to or larger than the opening angle (half apex angle α) of the Laval nozzle 9, and that the half apex angle (half apex angle β) of the diameter-enlarged nozzle 10 be 30 degrees or less.

As a result, a circulating flow is formed between the wall surface of the diameter-enlarged nozzle 10 and the jet flow of the combustion supporting gas G1 flowing in the center, the fuel G2 can be drawn into the diameter-enlarged nozzle 10, and a stable flame can be formed.

When the opening angle (half apex angle β) of the diameter-enlarged nozzle 10 is equal to or larger than the opening angle α of the Laval nozzle, a circulating flow can be formed between the wall surface of the diameter-enlarged nozzle 10 and the jet flow of combustion supporting gas G1 flowing in the center, and a stable flame can be formed.

Further, when the opening angle (half apex angle β) of the diameter-enlarged nozzle 10 is reduced while the cross-sectional area at the tip end side, which is the largest diameter of the diameter-enlarged nozzle 10, is fixed, the length of the circulation region becomes longer. Specifically, when the half apex angle β of the diameter-enlarged nozzle 10 is 30° or less, a sufficient circulation region is formed, and a stable flame can be formed.

In the burners 1A, 1B, and 1C of the present embodiment, the half apex angle γ of the protective nozzle 6 is preferably in a range of 5° to 45°.

As a result, the molten metal, the slag, and the like which enter inside the protective nozzle 6 can be satisfactorily discharged to the outside of the protective nozzle 6 by the jet flow of the combustion supporting gas G1 or the fuel G2.

When the half apex angle γ of the protective nozzle 6 is 5° or more, the length of the protective nozzle 6 becomes short, the heat loss to the protective nozzle 6 becomes small, and high thermal efficiency can be maintained. In addition, the heat flux to the inner surface of the protective nozzle 6 is reduced, and the damage to the protective nozzle 6 can be prevented. On the other hand, when the half apex angle γ of the protective nozzle 6 is 45° or less, the molten metal, the slag and the like which enter inside the protective nozzle 6 can be discharged without staying inside the protective nozzle 6.

(Method for Operating a Burner)

Fifth Embodiment

Next, as a fifth embodiment of the present invention, a method for operating the burners 1A, 1B, 1C will be described.

In the operation method using the burners 1A, 1B, and 1C of the present embodiment, oxygen having a concentration of 20.95% to 100% is used as the combustion supporting gas G1.

As a result, it is possible to form stably a high-speed flame without the blockage of the nozzle even when the fuel G2 having a low feed pressure or a low heating value is used.

Further, in the operation method using the burners 1A, 1B, and 1C of the present embodiment, it is preferable that the flow rate of the fuel G2 ejected from the fuel ejection outlet 3 be 10 m/s or more.

By setting the flow rate of the fuel G2 to 10 m/s or more, it is possible to suppress the entering of the scattered molten metal, the slag, and the like into the fuel ejection outlet 3, and it is possible to prevent the blockage by the molten metal, the slag, and the like.

In the operation method using the burners 1A, 1B, and 1C according to the present embodiment, when the ratio (stoichiometric ratio) of oxygen required to combust the fuel G2 completely is 1, the oxygen ratio is preferably in a range of 1 to 10.

Moreover, the oxygen ratio is a value defined by the following equation.

Oxygen ratio=(the amount of oxygen contained in the combustion supporting gas G1 supplied)/ (the amount of oxygen required to combust the fuel G2 completely)

Further, when the combustion supporting gas G1 is LNG the amount of oxygen required is 2.3 $Nm^3$ per 1 $Nm^3$ of LNG, so the flow rate of LNG can be obtained by the following equation.

Flow rate of LNG 32 [(the amount of oxygen contained in the combustion supporting gas G1 supplied)/2.3]/the oxygen ratio As a result, even when the fuel gas G2 has a low feed pressure or a low heating value, it possible to form stably a high-speed flame without the blockage of the nozzle In the burners 1A, 1B, and 1C of the present embodiment, when assuming the maximum diameter of the diameter-enlarged nozzle is $d_3$[m], the diameter at the tip end of the protective nozzle is $d_4$[m], and the flow rate of the fuel G2 required to combust at a stoichiometric ratio (oxygen ratio=1) with respect to the flow rate of the combustion supporting gas G1 supplied is $Q_f$[$Nm_3$/h], it is preferable that the $d_3$ and $d_4$ be set such that the flow rate V [Nm/s] of the fuel satisfy 50≤V≤200.

Moreover, as shown in the following equation (1), the flow rate V [Nm/s] of the fuel is obtained by dividing the flow rate Qf of the fuel G2 by an area A which is obtained by subtracting the area of the outlet of the diameter-enlarged nozzle 10 from the area of the outlet of the protective nozzle 6 (1).

$$V=(Q_f/3600)/A \qquad (1)$$

$$A=\pi/4 \times (d_4^2 - d_3^2).$$

By setting the flow rate V of the fuel determined by the above equation (1) to 50 to 200 Nm/s, it is possible to suppress the entering of the scattered molten metal, the slag and the like, and to stably form a high-speed flame.

When the flow rate V is 50 Nm/s or more, it is possible to prevent the entering of the molten metal, the slag, and the like. On the other hand, when the flow rate V is 200 Nm/s or less, the pressure in the nozzle is preferable for supplying the fuel having a low supply pressure, and a good flame can be formed around the jet flow of the combustion supporting gas G1 flowing in the center.

(Method for Melting and Refining a Cold Iron Source)

Sixth Embodiment

Next, as a sixth embodiment of the present invention, a method for melting and refining a cold iron source using the burner 1A, 1B and 1C will be described.

A method for melting and refining a cold iron source using the burner 1A, 1B, 1C includes a melting step in which the cold iron source is molten, and a refining step in which the cold iron source is refined after the melting step, wherein an oxygen ratio is adjusted in a range of 1 to 5 in the melting step, an oxygen ratio is adjusted in a range of 3 to 10 in the refining step, and a flow rate of the fuel is adjusted independently in the melting step and the refining step.

Under the condition of the oxygen ratio above, when the flow rate of oxygen is 1000 Nm³/h, the flow rate of LNG is set to 435 to 87 Nm³/h when the oxygen ratio is 1 to 5. On the other hand, when the oxygen ratio is 3 to 10, the flow rate of LNG is set to 145 to 43 Nm³/h.

Specifically, since the amount of oxygen required to combust LNG at a stoichiometric ratio (oxygen ratio=1) is 2.3 Nm³ per 1 Nm³ of LNG, when assuming that the flow rate of oxygen is $Q_{O2}$, and the oxygen ratio is m, the flow rate $Q_f$ of LNG is obtained by the following equation (2).

$$Q_f=(Q_{O2}/2.3)/m \qquad (2)$$

In the melting step, when using the combustion heat of LNG as a heat source, the oxygen ratio m is set to 1 or more, assuming that the LNG is completely burned. When the oxygen ratio is 1 (m=1), the flow rate $Q_f$ of LNG is set to about 435 Nm³/h according to the equation (2) above.

On the other hand, when cutting with oxygen in the melting step, the oxygen ratio m is set to 5 or less, assuming that the potential core of the jet flow of oxygen is maximally extended. When the oxygen ratio is 5 (m=5), the flow rate $Q_f$ of LNG is set to about 87 Nm³/h according to the equation (2) above.

On the other hand, in the refining process, when using the burner of this embodiment as an oxygen lance, oxygen is required for refining, so assuming that oxygen is not consumed completely, the oxygen ratio m is set to 3 or more. When the oxygen ratio is 3 (m=3), the flow rate $Q_f$ of LNG is set to about 145 Nm³/h according to the equation (2) above.

On the other hand, in the refining process, the oxygen ratio m is set to 10 or less, assuming the minimum flow rate of the fuel necessary for extending the oxygen jet flow. When the oxygen ratio is 10 (m=10), the flow rate $Q_f$ of LNG is set to about 43 Nm³/h according to the equation (2) above.

As described above, in the melting process and the refining process, in order to separate the functions of the burner, it is preferable to set the oxygen ratio for providing each of the functions and to set the flow rate of the fuel G2 independently.

Further, when the flow rate V determined by the above equation (1) is 50 to 200 Nm/s, the results of determining the maximum condition and the minimum condition of $d_4$ are shown in Table 1 below.

TABLE 1

|  |  | Conditions for maximizing $d_4$ | Conditions for minimizing $d_4$ |
|---|---|---|---|
| $Q_f$ | [Nm³/h] | 435 | 435 |
| $d_3$ | [mm] | 40.9 | 28.9 |
| V | [Nm³/h] | 50 | 200 |
| A | [m²] | 0.002417 | 0.000604 |
| $d_4$ | [mm] | 68.9 | 40.1 |

For example, when the flow rate of the combustion supporting gas (pure oxygen) is 1000 Nm³/h, the flow rate $Q_f$ of LNG is 435 Nm³/h (calculated when the oxygen ratio is 1), the ejection speed at the outlet of the combustion supporting gas is Mach 1.5, and $d_1$=20.2 mm, $d_2$=23.6 m, since $1.5 \leq A1/A2 \leq 3.0$, $d_3$ is in a range of 28.9 to 40.9 mm.

In the case that V=50 Nm/s in the equation (1) above, $d_4$ is maximum when A=0.002417 m². Therefore, when $d_3$=40.9 mm in the equation (1) above, $d_4$=68.9 mm.

On the other hand, in the case that V=200 Nm/s in the equation (1) above, $d_4$ is minimum when A=0.000604 m². Therefore, when $d_3$=28.9 mm in the equation (1) above, $d_4$=40.1 mm.

As a result, the diameter $d_4$ at the tip end of the protective nozzle 6 is in a range of 40.1 mm to 68.9 mm.

According to this embodiment, when the cold iron source is molten and refined in the furnace using the burner 1A, 1B and 1C, it is possible to improve the efficiency.

Moreover, the present invention is not necessarily limited to the embodiments above and it is possible appropriately modify and implement without changing the gist of the invention.

Specifically, although the burner 1A, 1B and 1C above includes the first and second nozzle members 7 and 8, the burner of the present invention is not necessarily limited to such a constitution, and appropriate changes may be made. For example, the first nozzle member 7 may be divided between the Laval nozzle 9 and the diameter-enlarged nozzle 10, and may be formed as separate nozzle members.

Hereinafter, the effects of the present invention will be made more apparent by examples. The present invention is not limited to the following examples, and can be appropriately modified and implemented without changing the gist of the invention.

EXAMPLE 1

In Example 1, using a burner 1A shown in FIG. 1 produced under the conditions shown in Table 2 below, the combustion state was confirmed, and the flow rate of the jet flow of the combustion supporting gas flowing in the center was measured. In Example 1, pure oxygen (100% concentration) was used for the combustion supporting gas, and LNG was used for the fuel.

On the other hand, as Comparative Example 1, the same measurement as in Example 1 was performed using the burner described in Patent Document 1 prepared under the conditions shown in Table 2 below.

TABLE 2

|  |  | Example 1 | Comparative Example 1 |
|---|---|---|---|
| Flow rate $Q_{O2}$ of combustion supporting gas | [Nm³/h] | 1000 | 1000 |
| Ejection speed of combustion supporting gas | [m/s] | 450 | 450 |
| Flow rate $Q_f$ of fuel | [Nm³/h] | 200 | 200 |
| Ejection speed of fuel | [m/s] | 150 | 150 |
| Area of outlet of diameter-enlarged nozzle/Area of outlet of Laval nozzle | [—] | 2 | 2 |
| Half apex angle β of diameter-enlarged nozzle | [°] | 8 | — |
| Half apex angle γ of protective nozzle | [°] | 5 | — |
| Diameter $d_4$ of protective nozzle | [m] | 0.06 | — |

As a result, it is confirmed that a stable flame was formed from the tip end of the protective nozzle 6 so as to surround the jet flow of the combustion supporting gas flowing in the center in the burner of Example 1.

Figure 4:
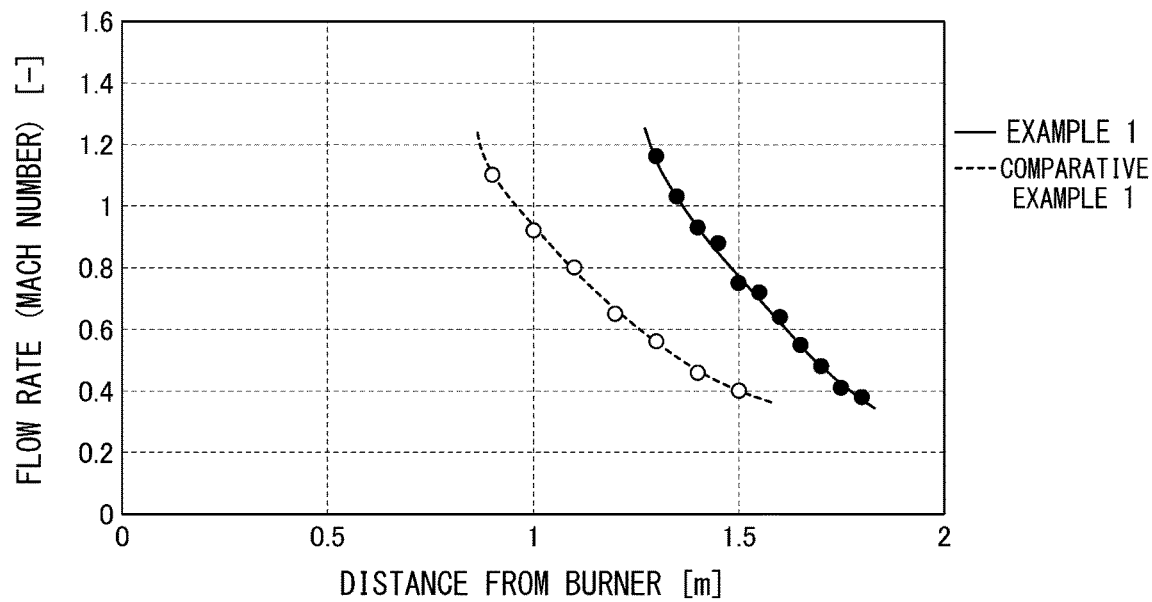
FIG. 4 is a graph showing a relationship between a distance from the burner and a flow rate of a combustion supporting gas in Example 1 and ComparativeExample 1.

In addition, the relationship between the distance [m] from each burner and the flow rate [Mach number] of the combustion supporting gas was measured in Example 1 and Comparative Example 1. The measurement results are shown in FIG. 4. In FIG. 4, the measurement result of Example 1 is indicated by a solid line, and the measurement result of Comparative Example 1 is indicated by a broken line.

As shown in FIG. 4, it can be seen that the burner of Example 1 was less susceptible to the damping of the flow rate of the combustion supporting gas than the burner of Comparative Example 1.

EXAMPLE 2

In Example 2, using a burner 1C shown in FIG. 3 produced under the conditions shown in Table 3 below, the combustion state was confirmed, and the flow rate of the jet flow of the combustion supporting gas flowing in the center was measured. In Example 2, pure oxygen (100% concentration) was used for the combustion supporting gas, and in order to simulate a fuel having a low calorific value and poor combustibility, the fuel was used by diluting LNG with nitrogen.

TABLE 3

| | | Example 2 |
|---|---|---|
| Flow rate $Q_{O2}$ of combustion supporting gas | [Nm³/h] | 1000 |
| Ejection speed of combustion supporting gas | [m/s] | 450 |
| Flow rate $Q_f$ of fuel | [Nm³/h] | 200 |
| Ejection speed of fuel | [m/s] | 200 |
| Area of outlet of diameter-enlarged nozzle/ Area of outlet of Laval nozzle | [—] | 2 |
| Half apex angle β of diameter-enlarged nozzle | [°] | 8 |
| Half apex angle γ of protective nozzle | [°] | 5 |
| Diameter $d_4$ of protective nozzle | [m] | 0.06 |

As a result, it is confirmed that a stable flame was formed from the tip end of the protective nozzle 6 so as to surround the jet flow of the combustion supporting gas flowing in the burner of Example 2 even when the fuel has a low calorific value.

Figure 5:
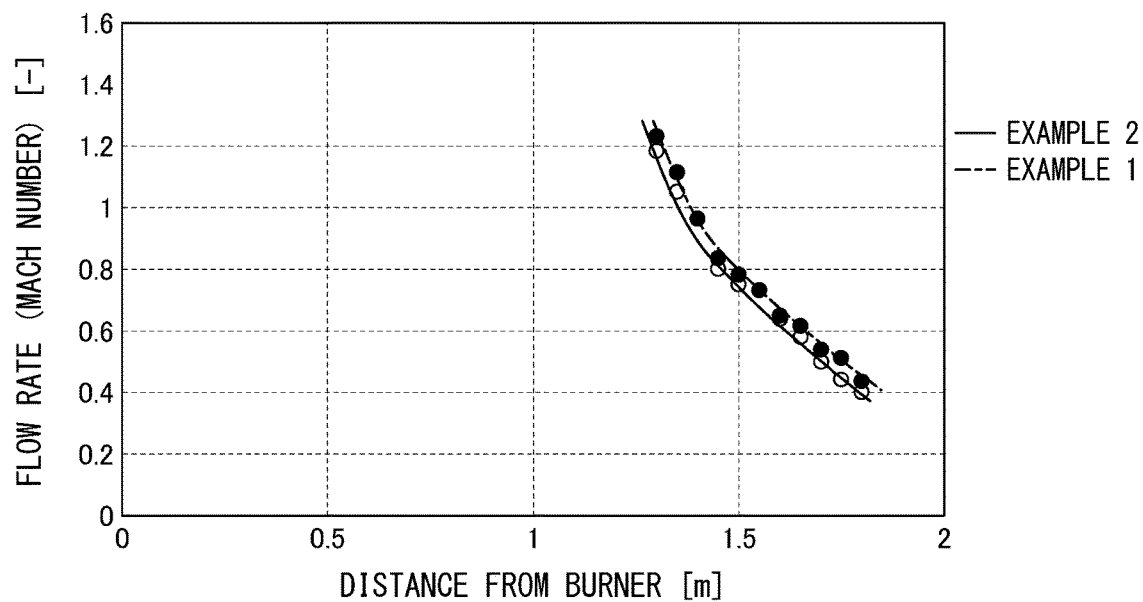
FIG. 5 is a graph showing a relationship between a distance from the burner and a flow rate of the combustion supporting gas in Example 2 and Example 1 as a reference example.

In addition, the relationship between the distance [m] from each burner and the flow rate [Mach number] of the combustion supporting gas was measured in Example 2. The measurement results are shown in FIG. 5. Further, FIG. 5 also shows the measurement results of Example 1 as a reference. In FIG. 5, the measurement result of Example 2 is indicated by a solid line, and the measurement result of Example 1 is indicated by a broken line.

As shown in FIG. 5, even when using fuel having poor combustibility, the same result as the burner of Example 1 can be obtained, and the damping of the flow rate of combustion supporting gas hardly occurs in the burner of Example 2.

EXAMPLE 3

In Example 3, the burners of Example 1 and Example 2 were installed in an arc furnace, and the blocked state of the nozzle due to the molten metal and the slag generated in actual operation was confirmed. As a result, it is confirmed that nozzle blockage did not occur, and stable operation could be performed.

EXPLANATION OF REFERENCE NUMERAL 1A, 1B, 1C burner
1a tip end surface
2 combustion supporting gas ejection outlet
3 fuel ejection outlet
4 combustion supporting gas supply passage
5 fuel supply passage
6 protective nozzle
7 first nozzle member
8 second nozzle members
9 Lavall nozzles
10 diameter-enlarged nozzle
11 diameter-equal nozzle
11a groove
20 water cooling jacket
G1 combustion supporting gas
G2 fuel
H cooling water

The invention claimed is:

1. A burner including a combustion supporting gas supply passage which is configured to supply a combustion supporting gas toward a combustion supporting gas ejection outlet provided at the center of a tip end side;
   a fuel supply passage which is configured to supply a fuel toward a fuel ejection outlet provided around the combustion supporting gas ejection outlet; and
   a protective nozzle provided from a position surrounding a periphery of the fuel ejection outlet so as to project forward beyond a tip end surface at which the combustion supporting gas ejection outlet and the fuel ejection outlet are provided;
   wherein the combustion supporting gas supply passage includes a Laval nozzle, and a diameter-enlarged nozzle of which a diameter increases from a tip end of the Laval nozzle toward the combustion supporting gas ejection outlet, and
   the protective nozzle has a shape which is gradually reduced in diameter forward from the tip end surface, and
   wherein when assuming a maximum diameter of the diameter-enlarged nozzle is $d_3$[m], a diameter at a tip end of the protective nozzle is $d_4$[m], and a flow rate of the fuel required to combust at a stoichiometric ratio (oxygen ratio=1) with respect to a flow rate of the combustion supporting gas supplied is $Q_f$[Nm₃/h], $d_3$ and $d_4$ are set such that a flow rate V[Nm/s] of the fuel obtained by dividing $Q_f$ by an area A, which is obtained by subtracting an area of an outlet of the diameter-enlarged nozzle from an area of an outlet of the protective nozzle obtained by the following formula (1), satisfy $50 \leq V \leq 200$ $$V=(Q_f/3600)/A \quad (1)$$

$$A=\pi/4\times(d_4^2-d_3^2).$$

2. The burner according to claim 1, wherein the combustion supporting gas supply passage includes a diameter-equal nozzle of which a diameter from a tip end of the diameter-enlarged nozzle to the combustion supporting gas ejection outlet is the same.

3. The burner according to claim 2, wherein a groove is provided on the entire inner circumferential surface of the diameter-equal nozzle.

4. The burner according to claim 1, wherein assuming that the cross-sectional area having the largest diameter at a tip end side in the diameter-enlarged nozzle is $A_1$, and the cross-sectional area having the smallest diameter at a proximal end side is $A_2$, $A_1$ and $A_2$ satisfy $1.5 \leq A_1/A_2 \leq 3.0$.

5. The burner according to claim 1, wherein an opening angle of the diameter-enlarged nozzle is equal to or larger than an opening angle of the Laval nozzle, and a half apex angle of the diameter-enlarged nozzle is 30° or less.

6. The burner according to claim 1, wherein the fuel ejection outlet includes a plurality of holes arranged concentrically with the combustion supporting gas ejection outlet.

7. The burner according to claim 1, wherein the fuel ejection outlet includes a hole concentrically formed with the combustion supporting gas ejection outlet.

8. The burner according to claim 1, wherein the half apex angle of the protective nozzle is in a range of 5° to 45°.

9. A method for operating a burner according to claim 1, wherein oxygen having a concentration of 20.95% to 100% is used as the combustion supporting gas.

10. The method for operating a burner according to claim 9, wherein a flow rate of the fuel ejected from the fuel ejection outlet is 10 m/s or more.

11. The method for operating a burner according to claim 9, wherein an oxygen ratio is in a range of 1 to 10.

12. A method for melting and refining a cold iron source using a burner according to claim 1,
   wherein the method includes a melting step in which the cold iron source is molten, and a refining step in which the cold iron source is refined after the melting step,
   an oxygen ratio is adjusted in a range of 1 to 5 in the melting step,
   the oxygen ratio is adjusted in a range of 3 to 10 in the refining step, and
   a flow rate of the fuel is adjusted independently in the melting step and the refining step.

* * * * *